Sept. 18, 1962 D. E. SUNSTEIN 3,054,853

SIGNAL PHASING SYSTEM FOR COLOR TELEVISION

Original Filed Sept. 15, 1950

4 Sheets-Sheet 1

INVENTOR.
DAVID E. SUNSTEIN
BY
Allen V. Hazeltine
ATTORNEY

SIGNAL PHASING SYSTEM FOR COLOR TELEVISION

Original Filed Sept. 15, 1950

4 Sheets-Sheet 2

INVENTOR.
DAVID E. SUNSTEIN

BY

Allen V. Hazeltine

ATTORNEY

Sept. 18, 1962 D. E. SUNSTEIN 3,054,853

SIGNAL PHASING SYSTEM FOR COLOR TELEVISION

Original Filed Sept. 15, 1950 4 Sheets-Sheet 3

INVENTOR.
DAVID E. SUNSTEIN
BY
Allen V. Hazeltine
ATTORNEY

Sept. 18, 1962 D. E. SUNSTEIN 3,054,853

SIGNAL PHASING SYSTEM FOR COLOR TELEVISION

Original Filed Sept. 15, 1950 4 Sheets-Sheet 4

INVENTOR.
DAVID E. SUNSTEIN
BY Allen V. Hazeltine
ATTORNEY 3,054,853
Patented Sept. 18, 1962

3,054,853
SIGNAL PHASING SYSTEM FOR COLOR TELEVISION

David E. Sunstein, Bala-Cynwyd, Pa., assignor, by mesne assignments, to Philco Corporation, Philadelphia, Pa., a corporation of Delaware Continuation of application Ser. No. 185,106, Sept. 15, 1950. This application Nov. 18, 1955, Ser. No. 547,621
12 Claims. (Cl. 178—5.4)

The present invention relates to cathode-ray tube image-presentation systems, the present disclosure being a continuation of my copending application, Serial No. 185,106, filed September 15, 1950. More particularly the present invention relates to a method of and apparatus for producing a television image in color by means of a single cathode-ray tube.

Color television systems are known which operate to produce, at three separate terminals of a receiver, three separate video signals, each indicative of the content in respect of a different color of the scene at the transmitter whose appearance is to be produced at the receiver. Thus, in the so-called "simultaneous" type of color television system, for example, there are produced simultaneously at the receiver three separate video signals, one indicative of the red component of light from the televised scene, a second representative of the blue component thereof, and a third video signal corresponding to the green component, these signals being hereinafter designated the red, blue, and green video signals respectively.

These three separate color signals are generated originally at the transmitting station, and may be transmitted to the receiver by either a frequency- or time-multiplexing system. When frequency-multiplexing is employed, the video color signals generated at the transmitter may be used to modulate three separate carrier waves of different frequencies, which are transmitted to the receiver in three separate frequency channels. At the receiver, the three channels of information may then be separated by suitable frequency-discriminatory means, detected, and the resultant three video color signals supplied to the three separate receiver terminals mentioned above.

When time-multiplexing is employed, the three video color signals produced at the transmitter may be sampled at predetermined time intervals to produce three separate pulse trains, which pulse trains may then be appropriately interleaved and transmitted upon a single carrier frequency. At the receiver, the composite pulse train is then detected and broken up into its three component pulse trains by appropriate time selection circuits. Although these pulse trains may themselves, in some instances, be used directly to form color images, there is described in the copending application No. 139,928 of W. P. Boothroyd and E. M. Creamer, Jr., filed January 21, 1950, a system in which the individual pulse trains are first filtered, or "smoothed," whereby the separate pulse signals indicative of each of the three primary colors are caused to persist for the durations of the intervals therebetween. In this event, the resultant three separate video signals produced after smoothing may be generally similar to the corresponding three video color signals produced in the frequency-multiplexed system described briefly hereinbefore.

Having produced the above-mentioned three separate primary color signals in any appropriate fashion, it then remains to convert these signals into optical phenomena in such manner as to convey to an observer the impression of an image which is a satisfactory reproduction in color of the original televised scene. In the past, this has been accomplished by supplying the three separate color signals to three separate color signals to three separate cathode-ray tubes, so as to produce, upon the screens of these tubes, three separate, substantially monochromatic, images of different colors. It then becomes necessary optically to superpose the three separate pictures thus produced, as by projecting images of the three separate cathode-ray tube screens upon a common viewing screen. Although, under special circumstances, such systems have been arranged to produce satisfactory color images, the use of three separate cathode-ray tubes together with optical equipment for superposing the images formed thereon, represents an inherently bulky and expensive arrangement. Furthermore, it has been found that the optical and electrical adjustments necessary to produce and to maintain proper registration between the several projected images when superposed, are often extremely critical. For these and other reasons, it has therefore become highly desirable to provide a system which, when supplied simultaneously at its three input terminals with separate signals respectively indicative of the varying values of the three primary color components of the televised scene, will operate simply and reliably to present upon the screen of a single cathode-ray tube a satisfactory reproduction of the scene in color.

One class of proposed color television systems which require but a single cathode-ray tube, is that in which the cathode-ray tube is provided with a special phosphor-striped screen, or, alternatively, in which the screen comprises an ordinary white phosphor but has associated therewith a striped optical filtering device, as described in more detail hereinafter. The striped screen which has been proposed for this purpose may comprise a translucent member, such as the tube face, upon which are disposed vertical stripes of different phosphors which luminesce in different colors in response to bombardment by the cathode-ray beam. One-third of the total number of phosphor stripes may be characterized by responding to electron bombardment to emit red light, another third respond by emitting blue light, and the remaining stripes produce green light each time they are impinged by the beam. These phosphor stripes may be arranged upon the tube face in adjacent color triplets, so that when the beam sweeps horizontally across the phosphor stripes from left to right, it encounters each of the three colors of stripes in succession, and in the order, red-blue-green. Further, the phosphor stripes are sufficiently narrow and spaced sufficiently closely, so that three successive stripes cannot be resolved from each other by the eye of an observer located at normal viewing distance.

In the alternative image-reproducing arrangement mentioned above, the cathode-ray tube screen may employ a uniform coating of an ordinary phosphor which emits substantially white light in response to bombardment by the beam. There is then employed a color filter having vertical stripe regions of differing spectral transmissivity, which stripes are similar in general geometric form and arrangement to the phosphor stripes described above, but which operate to transmit, rather than to emit, light of the corresponding primary colors.

With either of these cathode-ray tube structures, and with means for causing the beam to sweep transverse to the direction of the color stripes, the portions of each group or triplet of three successive color stripes which are impinged by the beam on the same horizontal scan may be considered as comprising a picture element, the apparent color of which, to the eye of the viewer, depends upon the brightnesses of the three colors of light emitted by the component color stripes thereof, and hence upon the intensities of the cathode-ray beam as it impinges each of the color lines in succession. To reproduce the color of the original televised scene in response to the three color video signals produced at the receiver, it becomes necessary in this arrangement to ensure that the intensity of the cathode-ray beam, as it impinges each color stripe, is controlled by the corresponding color signal. Thus it is necessary, in effect, to provide switching means for connecting the intensity-controlling electrode of the cathode-ray tube to each of the three sources of video color signals in the proper time relationship, so that the red video signal controls the beam intensity when the beam impinges red stripes, the blue signal is controlling upon impingement of blue stripes, and the green color signal determines the intensity of the beam each times it impinges a green stripe.

In connection with maintaining the proper time relationship between the sampling of the various color signals and the positions of the cathode-ray beam upon the various color lines of the screen, the following problems have been encountered. First, even in an ideal system in which the spacings between successive color stripes were precisely equal, and in which the lateral displacement of the cathode-ray beam was an exactly linear function of time, there would remain the problem of sampling the three video signals in sequence at the proper frequency, so as to provide color information at the proper time intervals, as well as the problem of maintaining the proper phase of sampling so that the desired correspondence between the sampling of each color signal and the impingement of the correspondingly-colored stripe was maintained. In such a system, it might be possible, in certain instances, to employ an oscillator of manually controllable frequency to determine the rate of sampling, and a manually adjustable phase-shifting network to produce the proper color phasing. However, both of these elements, in an actual embodiment, would be susceptible to time variations in their characteristics, due, for example, to temperature variations, and occasional or frequent adjustments of the manual controls would ordinarily be necessary.

The problem in a practical system is even more complicated than in the ideal system proposed above, due to the practical necessity for accommodating some nonlinearity in the lateral deflection of the cathode-ray beam, and, in some instances, for permitting some tolerance in the spacing of the stripes of the screen. In the ideal system described above, in which the sampling frequency was assumed to be constant, the requirements placed upon deflection linearity are so severe as to be generally impractical of achievement in commercial television receivers. Thus, it is noted that if the striped screen contains 1000 color stripes, for example, an error of only one-tenth percent in the deflection of the beam near the right-hand margin of the television raster, as compared with its distance from the left-hand margin when deflected with perfect linearity, would result in a phasing error of one full color stripe, so that the resultant color rendition would be completely incorrect. To obtain satisfactory color rendition, the linearity would actually have to depart from the ideal by considerably less than one-tenth percent. With regard to errors in the spacing of color lines, it is also to be noted that, even with perfect deflection linearity, a difference in color line spacing at different portions of the tube face would result in similar improper color phasing if such a system were employed.

Accordingly, it is an object of my invention to provide means for sampling an input signal in predetermined time relationship to the attainment by a cathode-ray beam of a predetermined position.

It is another object of my invention to provide apparatus which, when supplied at a plurality of input terminals with separate input signals, is operative selectively to supply said input signals to an intensity-controlling electrode of a cathode-ray tube in such manner that each input signal controls the intensity of the cathode-ray beam substantially exclusively when said beam impinges only certain predetermined portions of the cathode-ray tube screen.

Another object is to provide a system which requires but a single cathode-ray tube to produce a satisfactory color image in response to three separate video color signals, each indicative of a different color component of a televised scene.

Still another object is to provide such a system in which the internal structure of the cathode-ray tube employed therein need not be substantially different from conventional tubes of similar type.

A further object is to provide a color television image-presentation system of the class which employs a screen having laterally-displaced regions differently responsive to electron bombardment to produce light of different colors, which system will automatically accommodate substantial variations in the deflection velocity of the cathode-ray beam and in the spacings of the regions of the cathode-ray tube screen producing the differently-colored light.

The above objectives are achieved in accordance with the invention by employing a signal sampling device connected to the intensity-controlling electrode of the color cathode-ray tube, and adapted, upon suitable actuation, to sample the three color signals in sequence. In addition, there is employed a beam-perceptive device responsive to impingement of the electron beam upon predetermined portions of the cathode-ray tube screen to produce indexing signals indicative of the position of the beam with respect to the various color stripes. These indexing signals, containing intelligence as to the position of the beam upon the screen, are then used to control the actuation of the sampling device in such manner as to cause sampling of the proper color signal as the cathode-ray beam passes over each of the variously colored lines of the cathode-ray tube screen. In this system, variations in the rate at which the beam traverses color stripes are detected by the perception device and exhibited by the indexing signals produced thereby, the indexing signals then producing corresponding variations in the timing of the sampling operation so as to maintain proper color phasing. The beam-perceptive device utilized to generate the indexing signals, as well as the particular apparatus utilized for controlling the sampling device in response to indexing signals, may each have any of a variety of forms, the choice of which may suitably be made in accordance with the requirements of the particular system in which it is to be employed.

Thus, in one particular embodiment of my invention hereinafter described in detail, the beam-perceptive device comprises a grid or lattice of colored phosphor stripes disposed upon the tube screen, and three phototubes, each associated with an optical color filter passing light of but one of the primary colors, and each principally responsive to the impingement of the cathode-ray beam upon stripes of a different primary color, to produce three separate indexing signals. There are thereby produced a first indexing signal comprising pulses occurring when the beam impinges the red phosphor stripes, a second indexing signal comprising pulses occurring simultaneously with the impingement of the blue phosphor stripes, and a third indexing signal comprising pulses indicative of the bombardment of green phosphor stripes. The sampling operation is performed, in this instance, by connecting the three video color signals produced by the television receiver to the intensity-controlling electrode of the cathode-ray tube through separate sampling circuits which are rendered sequentially transmissive by suitably phase-related sampling signals derived from a common oscillator. The sampling signal used to effect sampling of each of the three color signals is phase-compared with the indexing signal produced by the phototube which responds to light of the corresponding color, and the error voltage thus derived is then used to control the frequency of the oscillator from which the sampling signal is derived, in such manner that a predetermined substantially fixed phase relation is maintained between each indexing signal and the corresponding sampling signal. This phase relation is such that sampling of each color signal is caused to occur at the times when indexing pulses are produced in response to impingement of color stripes of the corresponding color. Any tendency of the cathode-ray beam to decrease its lateral velocity near the right-hand margin of the raster, for example, then produces indexing signals at a lower rate, which, in turn, then produce an error voltage from the phase comparator of such polarity as to modify the frequency of the sampling signals to a corresponding extent, so as to tend to maintain the aforesaid fixed phase relation between indexing signals and sampling signals. With this system, proper color phasing may be maintained despite substantial variations in the rate at which the beam scans the phosphor stripes.

In another embodiment of the invention also described in detail hereinafter, there is employed a lattice of special indexing members, which are added to the cathode-ray tube screen specifically for the purpose of producing indexing signals, and are connected to an external circuit in such manner that an indexing pulse is produced each time the cathode-ray beam impinges an indexing member. These indexing members are preferably interleaved between groups or triplets of three adjacent color lines, and, by the timing of the pulses which they produce, provide a direct indication that the beam is about to commence scanning the following color triplet. In this embodiment, the indexing pulses so derived may be applied to a suitable delay line from which they are tapped off at appropriate intervals to actuate the sampling devices connecting the intensity-controlling grid of the cathode-ray tube to the three sources of video color signals. This system, in effect, provides substantially complete phase correction at the beginning of each group of three color lines, so that proper color phasing is maintained provided that the variations in rate of traversing color lines are not so great as to produce an excessive accumulation of error in traversing three adjajcent color lines, which latter condition will normally exist in practice.

Other features and advantages of the invention, as well as its principle and mode of operation, will be readily understood from a consideration of the following detailed description of several representative embodiments thereof, and by reference to the accompanying drawings, in which:

FIGURE 3A is a front view of a portion of a striped-phosphor screen member such as may be utilized in the system of FIGURE 1, while

FIGURE 6A is a front view of a portion of a screen member suitable for use in the system of FIGURE 5, while

Figure 1:
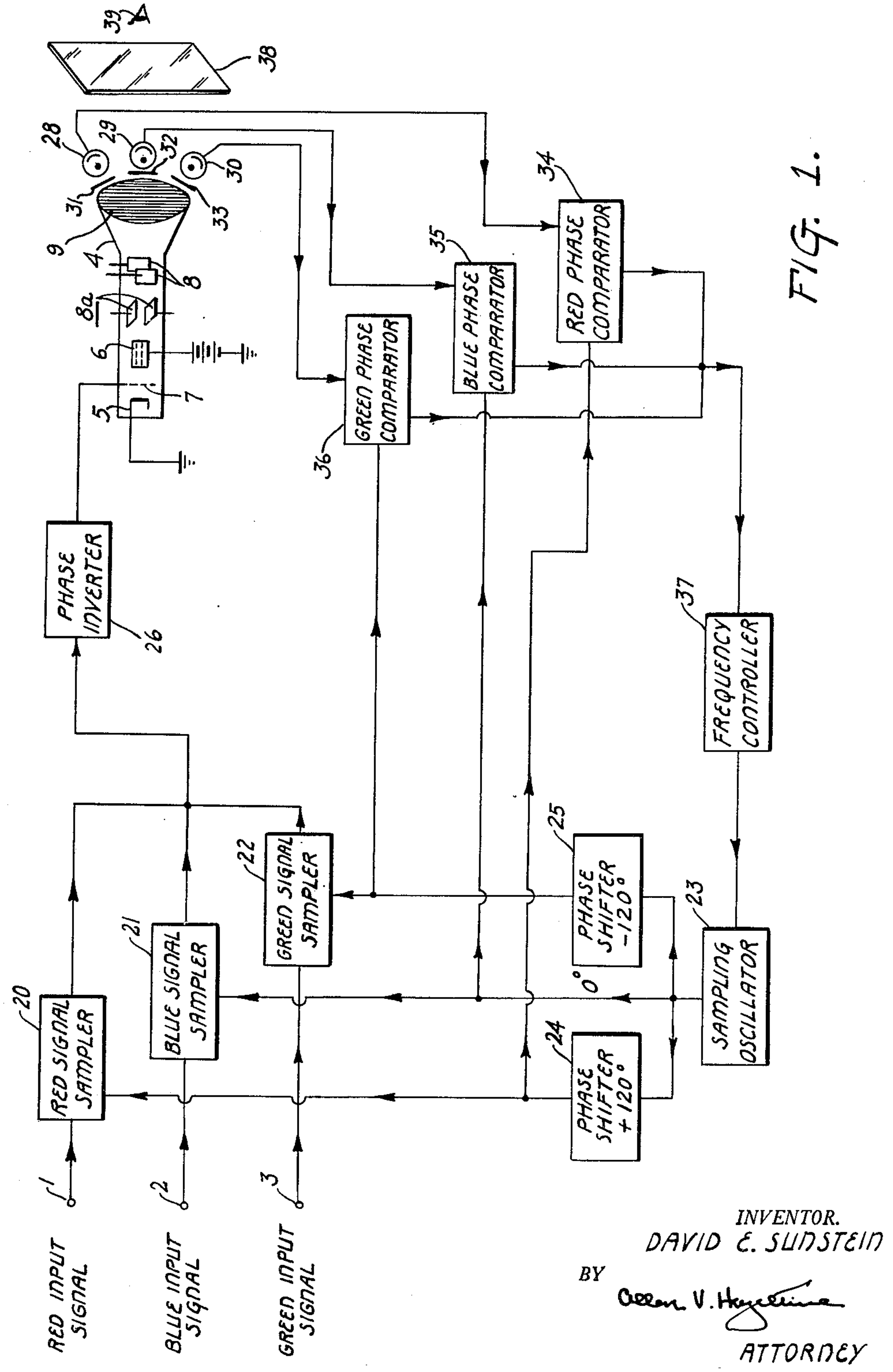
FIGURE 1 is a diagram, principally in block form, of a system arranged in accordance with the invention, in which photoelectric devices are utilized to perceive the position of the cathode-ray beam, and in which the signal sampling operation is controlled by controlling the frequency of an oscillator in response to an error voltage derived from a phase-comparator system.

Referring now to the embodiment of the invention represented generally in FIGURE 1, terminals 1, 2 and 3 are the input terminals of the system to which the red, blue and green video signals from the color television receiver are supplied, these signals having been suitably leveled in the receiver by conventional means, so that their D.C. levels have been restored. Although the system may be arranged to accommodate video color signals of either polarity, it is assumed in the present arrangement that the sense of video signals at the input terminals is such that bright portions of the televised picture are represented by the more positive portions of the signal, the darker portions of the signal, including the blanking and synchronizing pulses, being negative with respect thereto. As represented by the waveforms at A, B and C of FIGURE 2, the three input video color signals are so phased with respect to each other that, at any instant of time, all are representative of substantially the same portion of the televised scene. It is to be understood that the shape and relative proportions of the synchronizing and blanking pulses shown at the left of these waveforms, have been chosen for convenience in representation only, and are not to be taken as indications of the time scales employed in other parts of FIGURE 2.

Also shown is cathode-ray tube 4 to which samples of the video input signals are to be applied, which tube may be entirely conventional in its structure with the possible exception of the screen upon which the cathode-ray beam is adapted to impinge. Thus there may be employed therein an electron gun structure comprising a grounded electron-emissive cathode 5 and a first anode 6 supplied with a positive voltage for producing an electron beam, a control grid 7 for controlling the intensity of the beam, a beam-deflecting system comprising horizontal deflection plates 8 and vertical deflection plates 8A for varying the direction of the beam, and a screen 9 upon which the beam is adapted to impinge. It will be obvious to those skilled in the art that the deflecting plates 8 and 8A may be replaced, in many applications, by a suitable yoke for producing magnetic deflection of the beam, and that while control grid 7 will ordinarily be used to vary the intensity of the cathode-ray beam, intensity control may alternatively be obtained by variation of the voltages applied to other electrodes of the tube such as the cathode. It is understood that the deflecting signals applied to the beam deflecting system are, in any event, such as to cause conventional scanning of a television raster upon the screen 9, the intensity of which raster is controlled at each point thereof by the magnitude of the signal applied to control grid 7, the scanning of each line being suitably synchronized by conventional means with the application of the color video signals to the three input terminals of the system.

Screen 9 is characterized by successive regions of differing light characteristics in the lateral dimension thereof along which the horizontal, high-frequency deflection of the cathode-ray beam occurs. These regions are, in the present embodiment, preferably arranged so that the horizontally scanning beam impinges first a region which responds to produce red light, then a "blue" region, and finally a "green" region. The cathorde-ray tube screen structure may have any of several forms, two of which are illustrated in FIGURES 3A, 3B, and 4.

Figure 3A:
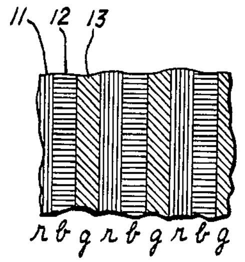
Figure 3B:
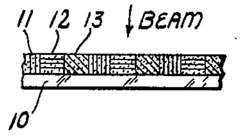
FIGURE 3B is a top view of the same screen portion.

Referring to FIGURES 3A and 3B, faceplate 10 may comprise the large end of the envelope of cathode-ray tube 4, and is preferably of a transparent glass which exhibits no marked spectral selectivity. Upon the internal surface of faceplate 10 are a series of vertically-elongated stripes of phosphors of different color characteristics. Thus, 11 represents a red phosphor stripe, 12 a blue phosphor stripe, and 13 a green phosphor stripe, each of these stripes, in response to impingement by the cathode-ray beam, producing light substantially exclusively of the corresponding color. Such phosphors are well known in the art, and their constitution need not be described here in detail. Each group of three color stripes may be termed a color triplet, the entire surface of the screen which is scanned by the television raster being covered with contiguously-disposed color triplets of the type just described. It is understood that the relative dimensions of the phosphor stripes as illustrated have been chosen for convenience in representation only. Thus, although, for purposes of illustration, the color stripes have been represented in the drawing as sufficiently wide to be readily resolved by the eye, the individual color stripes are actually so narrow that stripes of the same color triplet cannot be distinguished by the eye of an observer located at the normal position for viewing the screen. Similarly, the thickness of the phosphors will generally be much smaller, with respect to the widths of the stripes, than the dimensions of the drawing would indicate. The spacings and dimensions of these stripes are approximately the same at all portions of the screen.

Figure 4:
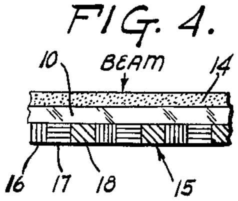
FIGURE 4 is a top view of a portion of another type of screen member which may be employed alternatively in the system of FIGURE 1.

FIGURE 4 represents an alternative screen arrangement, in which the face plate 10 is covered on its interior surface with a homogeneous phosphor layer 14, which phosphor, in response to bombardment by the cathode-ray beam, emits substantially white light. Placed in front of the face plate, and intermediate the viewer and the cathode-ray tube, is an optical striped filter 15. This filter may be placed in close proximity to the cathode-ray tube face plate, and is divided into regions of differing spectral transmissivity whose widths and spacings may be identical with those of the phosphor stripes of the screen of FIGURE 3A. It is to be noted, however, that in an equivalent arrangement, the filter may be remote from the face plate and the face plate optically imaged thereon, in which event the stripe regions may be geometrically similar to those described but of different absolute dimensions. In the present case, 16 represents a vertical stripe region of filter 15 which is adapted to transmit red light to the substantial exclusion of all other colors of the visible spectrum. Similarly, filter stripes 17 and 18 transmit principally blue and green light, respectively.

Whether screen 9 has the form represented in FIGURES 3A and 3B, or that shown in FIGURE 4, it is noted that a scanning of the cathode-ray beam transversely across the screen produces, in succession, red, blue and green light. Referring again to FIGURE 1, it is noted that, by utilizing the appropriate color signal to control the intensity of the cathode-ray beam each time it sweeps over a stripe region of screen 9, the component stripes of each color triplet may be activated on each horizontal scan to the proper extent to produce, in the eye of the viewer, an impression of a single resultant color which is substantially the same as the color of the corresponding portion of the televised scene.

To supply control grid 7 with each of the input video signals in sequence, there are employed three sequentially-actuated sampling devices whose combined output signals are supplied to grid 7, and whose inputs are supplied with the three separate color video signals. Thus, input terminal 1, to which the red video signal is supplied, is connected to the input of red signal sampler 20, while input terminal 2, to which the blue video signal is supplied, is connected to the input of blue signal sampler 21, the green signal sampler 22 being connected to input terminal 3 so as to be supplied with the green video signal. These samplers are operative to supply their respective color signals to control grid 7 in sequence, during sampling intervals whose times of occurrence are controlled by sampling signals applied thereto.

The source of these sampling signals is sampling oscillator 23, which generates a predetermined voltage waveform of controllable frequency. The signal from sampling oscillator 23, which may be sinusoidal in form, is separated into three portions whose phases are so adjusted as to differ mutually by one-third of a cycle, or 120°. Thus, one portion of the sampling oscillation may be applied to phase shifter 24, where it is advanced in phase by 120°, and then supplied as a sampling signal to red signal samples 20. The unmodified signal from the sampling oscillator may be applied directly to blue signal sampler 21, and the third portion of the sampling oscillation may be applied to phase shifter 25, which provides a phase delay of 120°, after which it is supplied to the green signal sampler 22.

Each sampler may be arranged so as to sample the video signal applied to the input thereof only during time intervals of relatively short duration occurring each time the corresponding sampling signal is in the vicinity of its maximum positive value. Thus, when the phase-advanced sine-wave supplied to red signal sampler 20 from sampling oscillator 23 reaches its positive peak value, this sampler is actuated and a sample of the red video signal is supplied to grid 7 of cathode-ray tube 4. One third of a cycle, or 120°, later, the blue signal sampler 21 is actuated to supply a sample of the blue video signal to control grid 7. Finally, one-third of a cycle later, the green signal is sampled.

Figure 2:
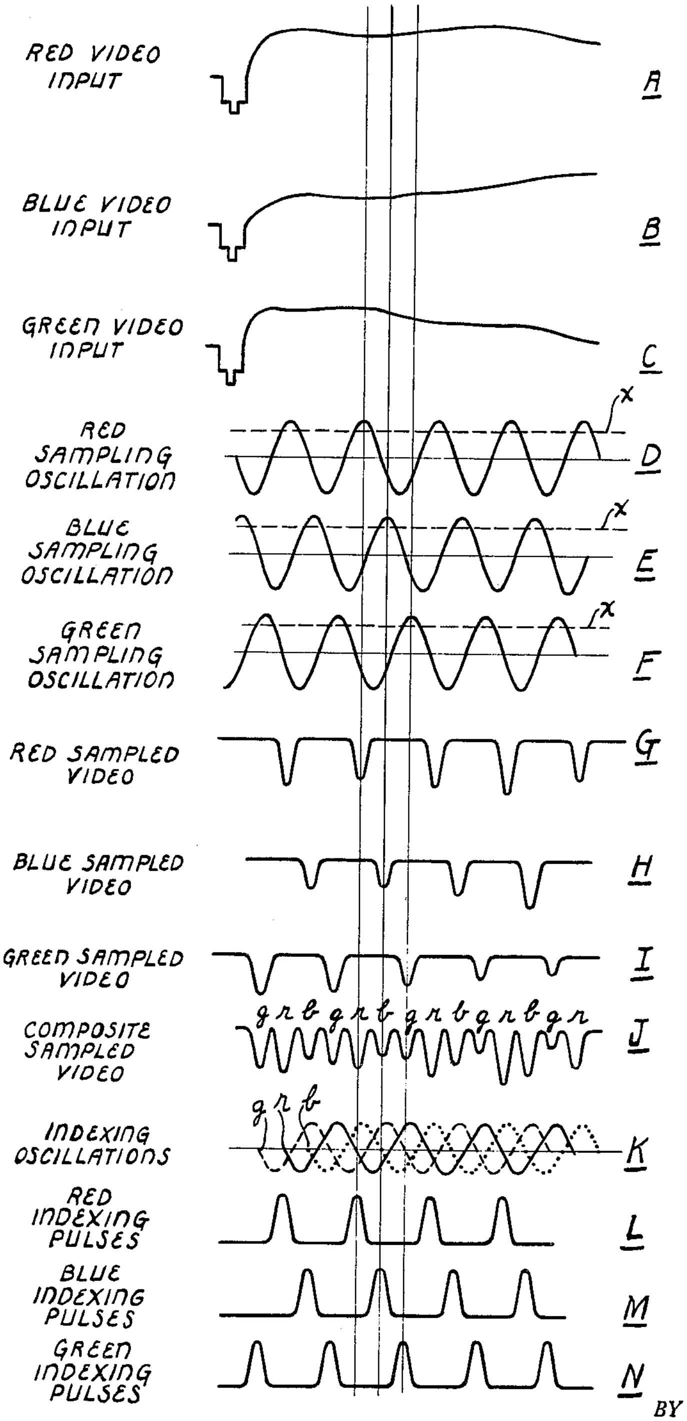
FIGURE 2 is a graphical representation to which reference will be made in explaining the mode of operation of the invention.

The operation of the portion of the system thus far described will be more readily appreciated from a consideration of the signal waveforms of FIGURE 2, in each of which the vertical dimension corresponds to voltage and the horizontal dimension to time. The video signal supplied to red signal sampler 20 may have the waveform illustrated at A, which represents generally the red signal corresponding to a portion of a single horizontal line of the television picture. Similarly, the simultaneously-occurring blue and green signals corresponding to the same portion of the same line are represented at B and C respectively. At E there is represented the sampling oscillation which is generated by oscillator 23 and supplied to blue sampler 21. The sampling signal applied to the red sampler is represented at D, and is advanced by 120° with respect to the blue sampling oscillation, while at F there is shown the green sampling oscillation which is delayed by 120° with respect to the blue sampling oscillation. It is understood that the form of each signal represented in FIGURE 2 is chosen for convenience in illustration only, and that there will generally be a large number of cycles of sampling oscillation for each line of the television raster, as determined by the number of color triplets in the scanned portion of screen 9. As is well known, it is generally desirable, for faithful image-reproduction, to provide for sampling of each color signal at a rate at least as great as twice the highest frequency present in the sampled signal.

During each of those intervals in which the red sampling signal is near its peak value, i.e. above the level X in the waveform at D, red sampler 20 produces an output pulse whose amplitude is proportional to the contemporaneous value of the red video signal shown at A. The resultant red sampled video signal is shown at G, the polarity of the pulses being indicated as negative in this instance because of the phase-reversing characteristics of the sampling device. Similarly, the blue sampled video signal shown at H is produced at the output of the blue sampler in response to actuation by the portions of the blue sampling signal lying above the level X, the sampling intervals and hence the pulses at the blue sampler output occurring one-third of a cycle after the sampling of signal. Finally, the output of the green sampler has the form shown at I, in which the pulse samples occur one-third of a cycle after the blue pulse samples.

Shown also at J of FIGURE 2 is the composite sampled video signal resulting from the combination of the output signals from the three color samplers. This signal, after undergoing a reversal of polarity in phase inverter 26 is applied to the control grid 7 of cathode-ray tube 4, and operates to increase the intensity of the cathode-ray beam by amounts proportional to the amplitudes of the successive color samples. These samples occur in the same order in which the color stripes of the screen 9 are scanned by the beam. Proper correspondence between the impingement of stripes of each color by the beam and the application of the corresponding color sample to grid 7, is then ensured in the following manner.

To maintain proper phasing between actuation of the several samplers and the position of the cathode-ray beam upon the variously colored stripes of the color triplets on the cathode-ray tube screen, there are employed beam-perceptive means for generating three indexing signals indicative of the color of the stripe which the cathode-ray beam is impinging at any time, together with means for utilizing the intelligence contained in these indexing signals automatically to control the frequency of sampling oscillator 23. Each indexing signal comprises a series of pulses occurring each time a phosphor stripe of predetermined color is impinged. These pulses are, in effect, phase-compared with sampling signals utilized to actuate the sampler for the corresponding color signal, the error voltage from the phase comparators being used to control the sampling oscillator in such manner that sampling of each color signal occurs only when an indexing pulse is produced by a correspondingly-colored stripe. Since indexing pulses occur contemporaneously with the impingement of the corresponding color strips, proper time coincidence between the impingement of each color of phosphor and the application of samples of the corresponding color signal to control grid 7 is maintained.

The beam-perceptive device used to derive the indexing signal may comprise three phototubes 28, 29 and 30, arranged to receive light from cathode-ray tube screen 9 through optical color filters 31, 32 and 33, respectively. Color filter 31 transmits principally the red component of the light from the screen, filter 32 passes principally the blue light, and filter 33 transmits principally green light. The phototubes are preferably arranged so as to be shielded from light from sources other than cathode-ray tube screen 9. The outputs of the three phototubes 28, 29 and 30, are connected to phase comparators 34, 35 and 36 respectively, to which are also supplied the three signals derived from sampling oscillator 23 which are utilized to actuate the three signal samplers 20, 21, and 22, also respectively. The three phase comparators are connected together at their output terminals, and are adapted to produce a predetermined reference voltage in the absence of indexing signals, which voltage is the same as that produced in the presence of indexing signals of the same frequency as the sampling oscillations and which bear a predetermined phase relation thereto. When, because of a change in scanning speed of the electron beam of tube 4 with respect to the color stripes, the frequency of indexing signals tends to change in one direction, so as to alter the phase relation between indexing signals and sampling oscillations in one sense, there is produced by the phase comparators a control signal of predetermined polarity, while the control signal of opposite polarity is produced for phase departures of the other sense.

The combined control signals from the three phase comparators are supplied to frequency controller 37, which, in turn, is connected to sampling oscillator 23 to control the frequency thereof. Frequency controller 37 is responsive to control voltages of one polarity to increase the frequency of sampling oscillator 23, and to control voltages of the opposite polarity to decrease the oscillator frequency. The polarity of the control signals is such that the frequency change of the oscillator is in each case in a direction to reduce the phase departure producing the control signal.

In the operation of the system of FIGURE 1, the cathode-ray beam of cathode-ray tube 4 is caused to scan horizontally across screen 9, in a direction transverse to the color stripes. Each time the beam impinges one of the color stripes, there is produced a simultaneous increment in the light output of the screen in respect of the corresponding color, which in turn produces a pulse of current in the corresponding phototube. Thus, when the beam impinges a red phosphor line, the corresponding increment in red light output is transmitted through color filter 31 to phototube 28, to produce a corresponding pulse signal. The beam next impinges the adjacent blue phosphor line, producing a signal pulse in phototube 29, after which the green stripe of the color triplet is impinged to produce a signal pulse in phototube 30. The indexing pulses from phototubes 28, 29, and 30 are represented generally in FIGURE 2 at L, M, and N respectively, and are indicative of the color of phosphor which is being impinged by the cathode-ray beam at any time.

Assuming first that the cathode-ray beam traverses stripes of the same color near the center of cathode-ray tube screen 9 at a rate equal to the frequency of sampling oscillator 23 when no control signal is applied thereto, the indexing signals produced by successive impingements of the various color stripes, and the sampling signals produced by the sampling oscillator, are at the same frequency, and, under the influence of the automatic phase controlling arrangement described above, assume the above-mentioned predetermined fixed phase relationship for which actuation of each sampler is coincident in time with corresponding indexing pulses. However, when the rate at which the cathode-ray beam traverses color stripes decreases, as may occur due to non-linearities in the deflecting system of the cathode-ray beam or to variations in the spacings of the color lines, the frequency of the indexing pulses from each of the phototubes will decrease correspondingly. As a result, the three phase comparators will each product control signals, which, when combined and applied to frequency controller 37, produce a deviation in the frequency of sampling oscillator 23 in a direction to reduce the frequency thereof to a value equal to the new rate at which color triplets are traversed by the cathode-ray beam, and to return the phase relation between sampling and indexing signals toward the aforesaid predetermined value. On the other hand, an increase in the rate at which the cathode-ray beam traverses color stripes produces a control signal from the phase comparators of opposite polarity, so as to increase the frequency of the sampling oscillations until the aforementioned predetermined phase relationship between sampling pulses and indexing signals is again substantially completely attained.

It will be apparent from the foregoing that the operation of the system, as just described, is such as to maintain a substantially fixed phase relation between the red indexing pulses shown at L in FIGURE 2, and the red pulse samples in the composite sampled video signal represented at J, and that the same phase relation is maintained between the blue and green indexing pulses shown at M and N and the blue and green pulse samples respectively as represented at J. This phase relation is such that the occurrences of each of the color samples in the composite sampled video signal shown at J are contemporaneous with the times at which the corresponding color stripes are impinged. Since the above-described phase relations are automatically maintained, the desired time coincidence between the impingement of stripes of each color by the beam and the application of samples of the corresponding color signal to the cathode-ray tube control grid, is ensured.

It is understood that phototubes 28, 29 and 30 are located with respect to the scanned area of the cathode-ray tube screen 9 so as not to interfere with a direct view of the television image by the observer. However, there is shown, in FIGURE 1, a glass plate 38 interposed between the viewing eye 39 of the observer and the cathode-ray tube screen 9. This plate provides some attenuation of the light emitted by the color image, and may comprise the protective plate ordinarily disposed in front of the cathode-ray tube in commercial television receivers. Although this plate is not essential to the practice of the invention, it represents in some instances a desirable adjunct thereto. For it is noted that, by its use, the background illumination of the television screen may be adjusted to produce substantial illumination of the phototubes, without impairing the apparent darkness to an observer of those portions of the scene which are intended to appear substantially black. By this means, there is provided a continuous scanning of a television raster upon the tube screen, with no regions which are entirely black, whereby the three phototubes are provided with an ever present illumination despite normal modulation of the beam by the picture information. It is to be noted that, in the typical use of the television receiver, the ambient illumination of the room containing the receiver is ordinarily such that the viewer will adjust the background illumination to a substantial value even though the attenuating glass plate 38 is not employed, thereby inherently producing the desired continuous illumination of the screen.

During the retrace of the beam, however, when the blanking signals are applied to video input terminals 1, 2 and 3, there will generally be no fluorescence of screen 9. This may, in some instances, prevent the automatic control system described above from regaining complete control of the frequency of sampling oscillator 23 until the beam has scanned several picture elements following each blanking interval. Thus there may be a narrow region at the extreme left margin of the picture where the color rendition is imperfect. As a result, it may be desirable, in some applications, to provide a masking system which occludes this narrow region from the eye of the observer.

Although the system of FIGURE 1 has been represented as employing three phototubes and three phase comparators, it is possible in certain applications to employ but a single phototube and phase comparator, while retaining the advantages of the invention. Thus the phototubes and phase comparators responsive to impingement of the blue and red phosphor stripes may be omitted, and adequate control obtained by utilizing only those signals produced in response to impingement of the green stripes, for example. In instances where this is done, it will sometimes be found desirable to employ increased gain in the sampling control system to retain the desired accuracy of control.

Several important features of the invention as represented in FIGURE 1 will be more readily appreciated from a closer consideration of the basic principle of operation thereof. In the arrangement of FIGURE 1 as first explained above, the combining of the ouptut signals from the three phase comparators causes the synchronization between the application of color signal samples to control grid 7 and the impingement of the correspondingly colored phosphor stripes to be correct on the average. Substantially perfect synchronization will be obtained for all colors if the centers of adjacent color stripes are equally spaced, but if a stripe of one color is differently spaced by a considerable amount, the synchronization with respect to all colors is affected thereby. To accommodate a screen structure employing unequally spaced color lines in each triplet, it is only necessary to modify the relative amounts of phase shift provided to the three sampling oscillations derived from the sampling oscillator. It will therefore be apparent that this system is capable of providing proper color phasing for any spacing of stripes in the color triplets, provided that the mutual spacings of the color lines in each triplet are in the same ratios at different portions of the screen. Similarly, it is desirable that the deflection velocity of the beam be substantially uniform while each triplet is scanned, but it need not be the same for different color triplets. This fact indicates the applicability of the invention in this form to systems in which the deflection velocity may vary considerably, so long as the change is relatively gradual.

Another feature of this system may be noted particularly clearly with reference to the modified form of FIGURE 1 proposed above, in which only one color of phosphor line, such as the green, is used for indexing. In this event, indexing pulses are produced when green lines are impinged, and the green signal samples are caused to occur at such times. The possibility then exists of applying the blue and red samples to control grid 7 at fixed intervals after the application of the green signals on the assumption, justifiable in many practical cases, that the time intervals between impingements of immediately successive stripes will not vary appreciably with the anticipated tolerances in deflection linearity and stripe spacing. A system utilizing this general principle is, in fact, described in detail hereinafter with reference to FIGURE 5. However, in some applications in which relatively large but gradual variations in deflection velocity are to be expected, it is apparent that operation on this principle will produce proper phasing of the green signal samples, but may permit some error in the phasings of the blue and red signal samples. This error may arise due to the fact that, while information is derived and utilized as to the position of the beam at various times, it is assumed that the deflecting velocity remains at least approximately constant at different portions of the screen. However, with the arrangement of FIGURE 1, information as to the velocity of the beam in the vicinity of the impinged color triplet is also available, and is utilized. This velocity information is indicated by the time interval between successive green indexing pulses, the pulse frequency being directly proportional to the deflection velocity and the pulse period being inversely related thereto. To obtain proper phasing for all colors with relatively large variations in deflection velocity, it is then desirable to vary the time spacing between the green sampling signals, which are automatically maintained in proper phase, and the blue and red sampling signals respectively, as a function of deflection velocity. This is accomplished by the phase-shifting arrangement of FIGURE 1, which, while maintaining a substantially constant 120° mutual phase difference between the three color sampling oscillations, produces variations in the actual time spacings of these oscillations with respect to each other. It will therefore be appreciated that this system embodies means for producing green indexing pulses, the repetition period of which is inversely proportional to the deflection velocity of the beam, together with means for varying the time-spacings of blue and red signal samples, with respect to green samples, in direct proportion to the period of green indexing pulses and hence inversely proportionally to the deflection velocity of the beam. The advantages of such an arrangement in certain applications will be apparent from the foregoing.

Figure 5:
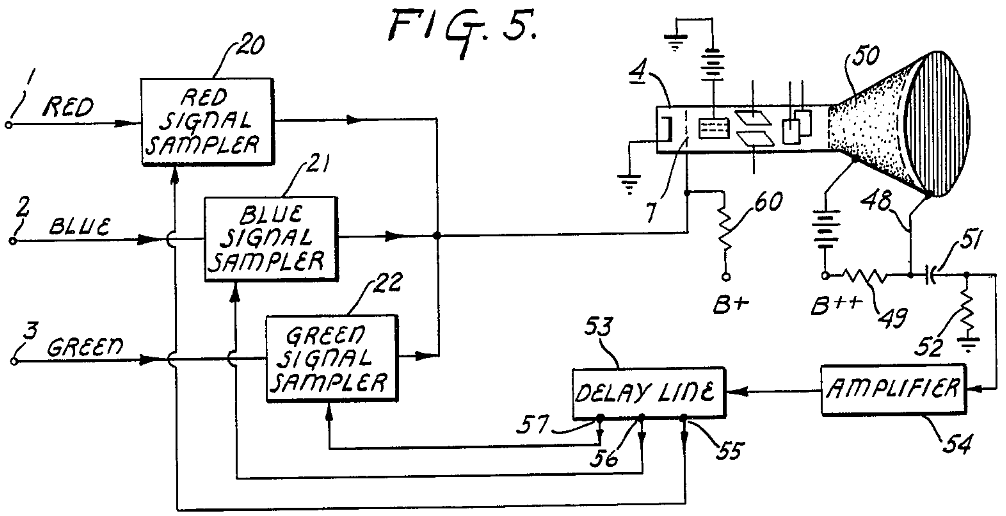
FIGURE 5 is a diagram, partly schematic and partly in block form, illustrating another system embodying the invention, in which the position of the cathode-ray beam is detected by secondary-electron emissive lattice members which produce indexing pulses upon electron impingement, and in which the signal sampling operation is controlled in substantially direct response to said pulses.

Referring now to FIGURE 5, the embodiment of the invention represented therein is similar in basic operation to that of FIGURE 1, but differs particularly in the means utilized for producing signals indicative of the position of the beam upon the cathode-ray tube screen, as well as in the method by which the indexing signals so derived are utilized to control the sampling of the three color video signals. It is understood that either the beam-perceptive apparatus or the means for controlling the sampling of the three color signals now to be described, may be utilized, with appropriate modifications, in place of the corresponding elements of the system illustrated in FIGURE 1.

In the present instance, the beam-perceptive apparatus may comprise a lattice of indexing members subject to impingement by the cathode-ray beam of tube 4 and arranged in predetermined geometric relation to the various color stripes of screen 9. Thus the indexing members may comprise special indexing stripes located on screen 9 between successive color triplets, each member producing an electrical pulse upon impingement by the cathode-ray beam. One particular type of screen of this general class will be described in detail hereinafter in connection with FIGURES 6A and 6B. With regard to the system utilized in the present instance for controlling the timing of the sampling of the color signals in response to the indexing signals thus produced, an important difference between the arrangement employed in the present instance and that represented in FIGURE 1, resides in the fact that the system now to be discussed utilizes the indexing pulses directly, after suitable time delay, to actuate the three color samplers in proper time sequence. This is in contradistinction to the general method employed in the system of FIGURE 1, in which the indexing pulses control the sampling operation indirectly, by controlling the frequency of a free-running sampling oscillator. It is to be noted that the details of construction and operation of the system of FIGURE 5 are clearly set forth in the copending application No. 198,709, of Carlo V. Bocciarelli, filed December 1, 1950, and hence need not be set forth here with particularity.

Figure 6A:
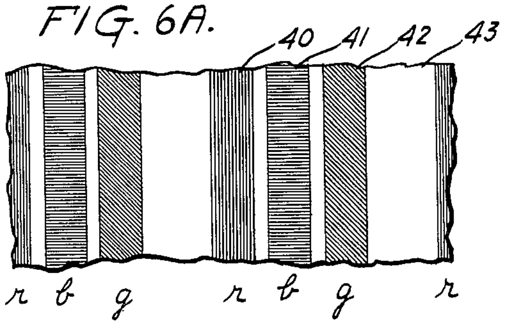
Figure 6B:
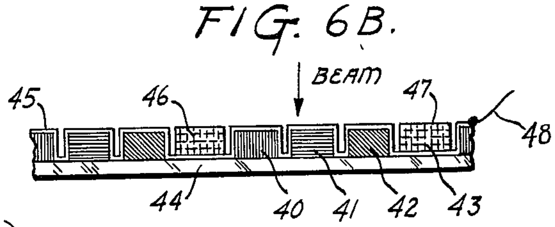
FIGURE 6B is a top view of the same screen portion.

Referring now to FIGURES 6A and 6B, screen 9 is seen to comprise in this instance a series of spaced vertical stripes of colored phosphors, arranged in successive color triplets across the lateral dimension of the screen, but with a region between color triplets which contains an indexing stripe instead of a phosphor stripe. Thus, in the front view of FIGURE 6A, vertical stripe regions 40, 41, and 42 indicate the locations of the red, blue and green phosphor stripes respectively, while stripe region 43 represents the space occupied by an indexing stripe. As is shown more clearly in the top view of FIGURE 6B, the phosphor stripes may be deposited upon a translucent supporting member such as glass plate 44, which may be the large end of the cathode-ray tube 4. The assembly comprising the glass plate and the phosphor stripes is coated, on the surface nearest the source of the cathode-ray beam, with a thin conductive film 45 which may be of aluminum, by a metal evaporating method, for example. It will be appreciated that the representations of FIGURES 6A and 6B are intended for illustrative purposes only, and that the dimensions, such as the thickness of the phosphor stripes and of the aluminum film, are not necessarily representative of the dimensional relationships actually employed. Thus aluminum film 45 is actually sufficiently thin to permit the electrons of the cathode-ray beam to pass therethrough without substantial loss of energy, so as to permit substantially normal activation of the phosphors by the beam. The purpose of the spaces between adjacent color stripes will be explained hereinafter.

On the surface of the aluminum film which is exposed to the cathode-ray beam, there are located a series of indexing stripes such as 46 and 47, which indexing stripes are parallel to the phosphor stripes, equal in number to the number of color triplets of phosphors, and located in angular registry, with respect to the source of the cathode-ray beam, with those regions such as 43 which are located on plate 44 between successive color triplets and which are not coated with phosphors, so that the indexing stripes are impinged by the cathode-ray beam whenever the beam is directed toward these latter regions. A lead 48 from aluminum film 45 is brought out of the tube for connection to the external circuit.

Indexing stripes 46 and 47 are composed of a material having a secondary emission ratio which differs substantially from that exhibited by aluminum upon impingement by electrons having the energies of those in the cathode-ray beam. One material which has been found to be suitable for use in the indexing stripes is gold.

Referring again to FIGURE 5, in which elements corresponding to those of FIGURE 1 are indicated by corresponding numerals, lead 48 connects aluminum film 45 to a source of high voltage designated B++, through an isolating resistor 49. The second anode 50 of the cathode-ray tube, which will conventionally comprise a conductive coating upon the inner surface of the conical portion of the cathode-ray tube, may be supplied with a slightly higher voltage, so as to serve as an efficient collector of secondary electrons. Connected to aluminum film 45 by lead 48 is one terminal of coupling condenser 51, whose other terminal is grounded through load resistor 52. In typical arrangements, the high voltage from source B++ may be 20 kilovolts, the voltage supplied to second anode 50 may be 22 kilovolts, isolating resistor 49 may have a value of 5,000 ohms, coupling capacitor 51 may be a 500 microfarad condenser, and the value of load resistor 52 may be 1000 ohms.

In the operation of the beam-perceptive indexing arrangement described above, the cathode-ray beam is caused to scan a conventional television raster upon screen 9, in which the horizontal scanning lines may be substantially at right angles to the direction of the phosphor stripes of the screen, although other scanning angles may obviously be employed. As the cathode-ray beam scans horizontally across the aluminum film of the screen, secondary electrons are emitted from the film and are collected by second anode 50. The magnitude of the secondary electron current thus produced as the beam scans across portions of the aluminum film lying between successive gold indexing stripes remains substantially constant, in the absence of picture modulation of the beam. However, since the average number of secondary electrons emitted in response to bombardment by an electron of the cathode-ray beam is substantially greater for gold than for aluminum, the secondary emission current flowing to the second anode 50 increases sharply each time the cathode-ray beam scans across a gold indexing stripe. These variations in secondary-electron emission current are coupled, in effect, to load resistor 52 by coupling condenser 51.

Thus there is produced across load resistor 52, a pulse of voltage each time the cathode-ray beam impinges a gold indexing stripe located between successive triplets of color stripes on the cathode-ray tube screen. Isolating resistor 49 is provided to prevent the short-circuiting of these pulses to ground through the low impedance presented to high frequency signals by the high voltage source B++. Each pulse produced across load resistor 52 is indicative of the fact that the cathode-ray beam is, at that instant, impinging an indexing stripe, and, after a predetermined interval of time, will be centered upon the immediately succeeding phosphor stripe.

The indexing pulses thus produced when the cathode-ray beam impinges the gold indexing lines of tube screen 9, are supplied from resistor 52 to the input of a delay line 53 through an amplifier 54. This amplifier provides sufficient gain to produce, at its output terminals, indexing pulses of convenient amplitude, and is preferably arranged to limit in response to the weakest pulses supplied thereto, as by overloading, so as to minimize variations which may be produced in the amplitudes of indexing pulses in response to picture modulation of the cathode-ray beam. Delay line 53 may be entirely conventional in design, being adapted to provide a time delay, for indexing pulses traversing it, which delay is at least as great as the time required for the cathode-ray beam to scan across a complete group of three adjacent color stripes of cathode-ray tube screen 9. Thus delay line 53 may comprise a plurality of similar filter sections connected in series, each section comprising an arrangement of lumped circuit elements providing a predetermined amount of signal delay. The delay line is preferably terminated in a resistance equal to the characteristic impedance of the line, so as to minimize reflections from the end thereof.

Located along delay line 53 at equal intervals are three signal taps, at which points pulse signals may be abstracted from the line. Tap 55 is so spaced from the input of the delay line that the signals reaching it are delayed, with respect to their time of application to the input thereof, by an amount substantially equal to the average time required for the cathode-ray beam to sweep from the center of an indexing stripe such as 46 in FIGURE 6B, to the center of the next succeeding red phosphor stripe such as 40. Tap 56 is spaced from tap 55 by an amount such that the delay between these two taps equals the average time required for the beam to sweep from the center of a red stripe such as 40 to the center of the next blue stripe 41, and tap 57 is, in turn, spaced from tap 56 by an amount sufficient to provide a signal delay between these last two taps substantially equal to the average time required for the beam to sweep from the center of a blue stripe such as 41 to the center of the next succeeding green stripe 42. Taps 55, 56 and 57 are then connected to the red, blue, and green samplers respectively.

Considering the timing of the various pulses produced it is noted that the indexing pulses applied to the input of delay line 53 occur at times when the beam is directed toward the indexing stripes of the cathode-ray tube screen, and the pulses at taps 55, 56, and 57 occur at times when the beam impinges the red, blue, and green phosphor lines respectively. The pulses at the three taps of delay line 53 therefore occur at those times when it is desired to apply the corresponding color video signals to the intensity-controlling grid 7 of cathode-ray tube 4.

In the operation of the portion of the sampling control system thus far described, an indexing pulse occurring when the cathode-ray beam strikes an indexing stripe in screen 9, such as indexing stripe 46, is supplied substantially instantaneously to the input of delay line 53. After the time required for the beam to travel to a position in which it impinges the following red phosphor stripe 40, the indexing pulse has arrived at tap 55 and is supplied instantaneously to red sampler 20 to produce actuation thereof, whereby the red video input signal is supplied to control grid 7 of cathode-ray tube 4 to control the intensity of the beam. By the time the beam has reached the following blue stripe 41, the indexing pulse has reached tap 56 and operates to produce substantially simultaneous actuation of blue sampler 21 whereby the blue video signal is caused to control the beam intensity as the blue stripe is impinged. Similarly, when the beam reaches the next green stripe 42, the indexing pulse has reached tap 57 and actuates green sampler 22 to permit intensity control of the beam by the green video signal.

Following the activation of the green phosphor stripe, the voltage at control grid 7 returns to a fixed reference value, at which it remains while the beam impinges the next succeeding indexing stripe, such as 47, at which time the next indexing pulse is generated. This next indexing pulse is then applied to delay line 53, and the cycle of actuation of the samplers is repeated as before.

To insure the production of strong and distinct indexing pulses, it is desirable that the reference voltage to which control grid 7 is returned be sufficiently positive to produce a beam of high intensity when the indexing stripes are impinged. Thus it is desirable from this viewpoint that the reference voltage applied to the control grid 7, through grid resistor 60, from the voltage source designated B+ in FIGURE 5, be sufficiently positive to produce a beam intensity at least as great as any which is required for reproduction of any portion of the television image. Under these conditions, the secondary emission from screen 9 is always considerably greater when gold indexing stripes are impinged than when the aluminum film 45 is impinged, because of the greater secondary-emission ratio of gold. The indexing pulses are then readily distinguishable from variations due to picture modulation of the beam.

It then becomes necessary in the present embodiment to apply color pulses to grid 7 which are directed in a negative direction, so that the intensity of the beam is reduced during such pulses to values determined by the picture content. The phase inverter 26 represented in FIGURE 1 is therefore omitted in the present embodiment. However, since black portions of the picture in this case are produced by negative pulses of large amplitude at grid 7, the lighter portions being represented by negative pulses of smaller amplitude, the white portions of the three video signals applied to the three signal samplers are preferably negative at the input terminals thereof, with respect to the darker portions and the synchronizing pulses. It is noted that the polarity of the input color video signals is therefore opposite to that employed in the previously described embodiment of FIGURE 1.

Because, with the above arrangement, the intensity of the cathode-ray beam tends to return to full intensity between color pulses applied to control grid 7, it is preferable in the present embodiment ot provide some spacing between adjacent phosphor stripes. By this means, the beam is caused to impinge regions containing no phosphor when it tends to return to full intensity between successive color pulses, and it therefore has no appreciable effect at these times upon the relative strengths of the various colors of light emitted by the screen.

With the system of indexing described above with reference to FIGURE 5, it is noted that the groups of color triplets may be spaced in any manner across the lateral dimension of the tube screen, so long as the spacings in the direction of the scan between each indexing stripe and each color stripe of the following triplet, do not differ radially as between different triplets.

Thus there is provided proper synchronization between the sampling of the three color video signals and the impingement of the cathode-ray tube beam upon the variously colored phosphor stripes, so long as variations in the linearity of the beam scanning and in the spacing of the color lines are not excessive. This system is based upon the supposition readily realizable in practice, that if a signal can be produced indicative of the arrival of the beam at a point on the tube screen immediately preceding a color triplet, and if the red, blue, and green samplers are actuated at predetermined fixed intervals thereafter, errors in color phasing can arise only as a result of departures from normal of the beam velocity, or stripe spacing, occurring during the scanning of a single color triplet. This is in distinction to certain systems of the prior art in which the error in color phasing which exists for a color triplet located near the right margin of the screen, for example, may be equal to the sum of the errors produced during the scanning of all those color triplets traversed by the beam as it travels from the left margin of the picture to the color triplet under consideration. By means of the operation outlined above, there is no accumulation of errors in the phasing between the sampling of the three signals and the positions of the cathode-ray beam, since, in effect, the phasing is corrected at the beginning of each color group. Compensation for the types of non-linearity in beam scanning and phosphor stripe spacing which are normally to be expected in practical systems are therefore realized by this arrangement.

Figure 7:
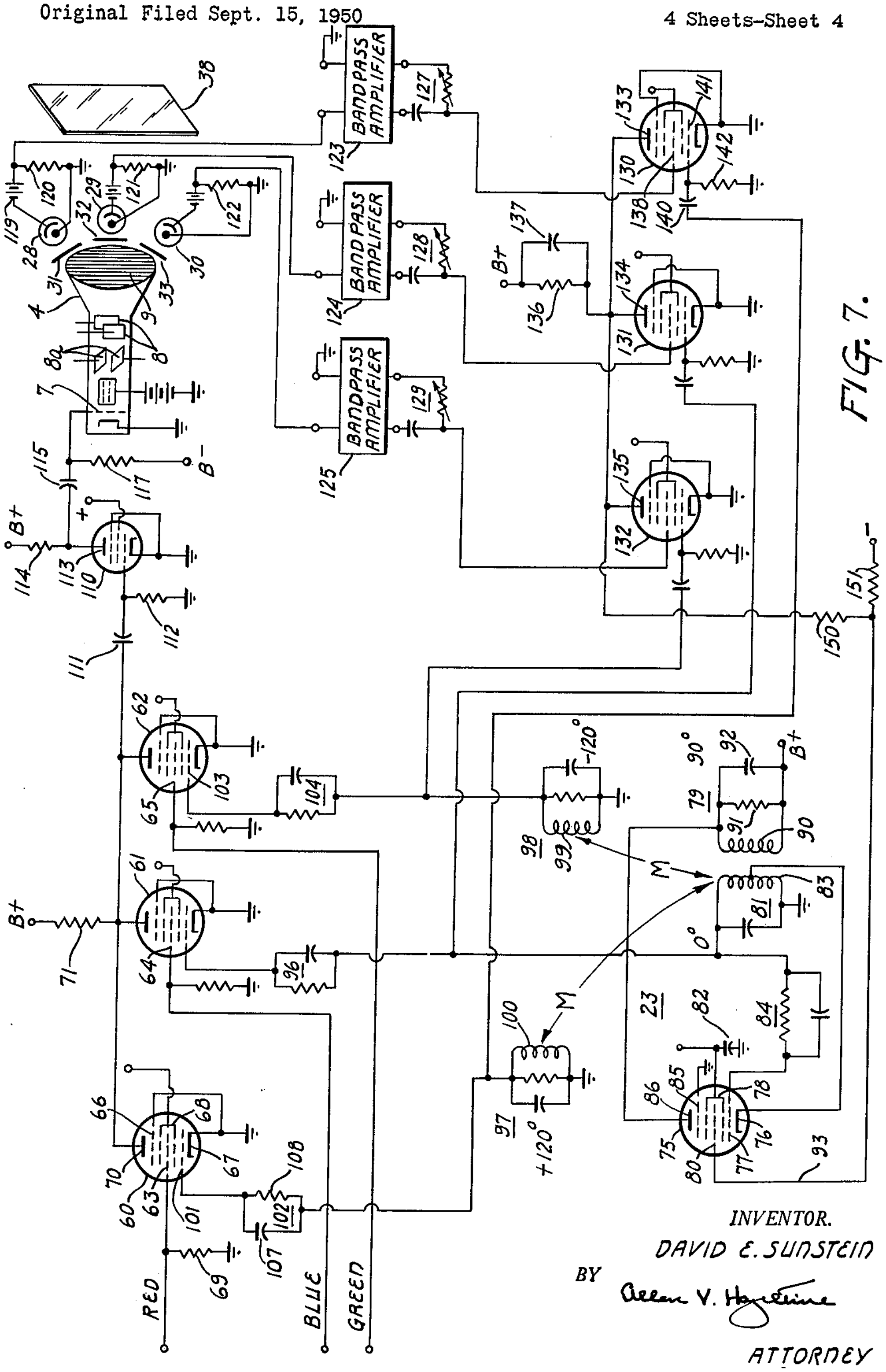
FIGURE 7 is a diagram, principally schematic, showing in detail circuits suitable for use in the embodiment of FIGURE 1.

Referring now to the diagram of FIGURE 7, there is shown in detail a system of the type represented in FIGURE 1, corresponding numerals in the two figures indicating corresponding parts.

The video color signal samplers are seen to comprise in this instance three pentagrid vacuum tubes 60, 61, and 62, whose second control grids 63, 64, and 65 are supplied with the red, blue, and green video input signals respectively. Referring to the red sampler tube 60, the suppressor 66 and cathode 67 thereof may be grounded, and the screen 68 supplied with a suitable source of screen potential (not shown), while the second control grid 63 is provided with a conventional grid leak resistor 69 connected to ground. The plate electrode 70 is connected through a plate load resistor 71 to a source of positive potential designated B+. The arrangements and connections of the blue and green sampler tubes 61 and 62 may be identical with those described for the red sampler tube 60, resistor 71 comprising a common plate load for all three tubes.

The three sampler tubes are rendered sequentially conductive by suitably phase-related sampling signals applied to the first control grids thereof, which sampling signals are derived in a manner described in detail hereinafter. Each sampler tube is characterized by the fact that the plate current therethrough during its intervals of conduction, is determined both by the voltage applied to the first control grid and that supplied to the second control grid thereof. Since, as will become more apparent hereinafter, the peak positive value of the voltage applied to the first control grid is substantially the same for all intervals of conduction, the peak values of plate current pulses produced by each tube vary in direct proportion to the simultaneously existing magnitudes of the corersponding input color video signals applied thereto. Thus, the negative voltage pulses produced across common load resistor 71 by red sampler tube 60, during its intervals of conduction, represent pulse samples which are proportional to the coexistent values of the red video input signal applied to grid 63, and are represented at G in FIGURE 2. Similarly, the negative voltage pulses produced across common load resistor 71 in response to plate current pulses in sampler tube 61, are representative of the corresponding instantaneous values possessed by the blue video input signal during the intervals of conduction of tube 61, as represented at H in FIGURE 2. Finally, the green video input signals supplied from terminal 3 to second control grid 65 of the green sampler tube 62, produce negative voltage pulses across common load resistor 71 indicative of the coexistent values of the green video signal, which pulse samples are represented at I in FIGURE 2.

Examination of the pulse samples shown at G, H, and I of FIGURE 2, indicates that the pulse samples produced by tubes 60, 61 and 62, respectively, differ mutually in their times of occurrence by one-third of the interval between successive pulses from each tube. This results from the mutual 120° phase spacing of the three sampling oscillations applied to the first control grids of the three sampler tubes, as represented at D, E, and F of FIGURE 2. The manner in which these sampling oscillations are derived will now be explained.

The source of the sampling oscillations applied to the three sampler tubes is sampling oscillator 23, which operates to produce a sinusoidal output signal the frequency of which is controllable in response to a control voltage applied thereto. This oscillator is seen to comprise a pentagrid vacuum tube 75, whose cathode 76, first control grid 77, and screen 78, are utilized as elements of a triode amplifier connected in a Hartley oscillator circuit. The remaining elements of tube 75, together with quadrature circuit 79, comprise means for varying the frequency of this oscillator in response to a control voltage applied to second control grid 80. Since this type of oscillator has been described in detail in Patent No. 2,494,795 of William E. Bradley, of common assignee, it need not be described here in detail. It will be sufficient to point out the following essential facts relating thereto, realizing that other oscillators of controllable frequency may be utilized instead.

In the oscillator portion of the circuit, a resonant tank circuit 81 is connected in effect between the first grid 77 of the tube and the screen electrode 78 thereof, the screen electrode serving in this instance as a plate. Screen 78 is supplied with a suitable source of positive potential (not shown), and is by-passed to ground for signal frequencies by capacitor 82, whereby a suitable connection between the screen electrode and the grounded end of tank circuit 81 is provided for signal frequencies. The cathode 76 is connected to a tap on the inductor 83 of tuned circuit 81, and the grid leak-grid condenser combination 84 is located in series between grid 77 and the ungrounded end of the tank circuit. The time constant of the grid resistor-grid condenser combination 84 is such that the oscillator operates class C, producing conduction in tube 75 during relatively brief portions of each cycle of the sinusoid developed across tank circuit 81.

The suppressor 85 of tube 75 may be grounded, while the plate 86 thereof is connected to a source of positive potential designated B+, through the resonant quadrature circuit 79 comprising the parallel combination of an inductor 90, a resistor 91, and a capacitor 92. Substantially only the fundamental component of the pulse signal in tube 75 appears across the quadrature circuit. This latter circuit is inductively coupled to oscillator tank circuit 81, in such manner that signals produced in the quadrature circuit in response to current pulses in tube 75 are supplied to the oscillator tank circuit in phase quadrature with oscillator signals generated therein. This arrangement is equivalent to coupling a pure reactance across the oscillator tank circuit. The frequency of the oscillator is therefore determined in part by the magnitude of the quadrature signal produced in quadrature circuit 79. To vary the frequency of oscillation, it is then only necessary to vary the potential applied to second control grid 80 of tube 75, thereby controlling the magnitude of the quadrature component of signal. Grid 80 is therefore supplied with a control voltage from lead 93, by means of which the oscillation frequency is controlled, a reduction in this voltage producing a frequency decrease in the present instance, while an increase in control voltage produces a frequency increase.

The sinusoidal voltage produced across resonant circuit 81 may be coupled to the first control grid of blue sampler tube 61 through a resistance-capacitance network 96. This signal is represented at E in FIGURE 2. Signal from resonant circuit 81 is also coupled by mutual inductance to each of two phase shifting circuits 97 and 98, one of which is operative to retard the phase of signals by 120°, the other which is operative to advance the phase thereof by 120°. Thus, phase shifter 97 may comprise a parallel-resonant circuit grounded at one end and coupled to resonant tank circuit 81 in such manner that, if the phase shifter were tuned to resonance at the frequency of the oscillations in the tank circuit, the signal produced in the phase shifter would be advanced by 90° with respect to those in the tank circuit. However phase shifter 97 is adjusted, by tuning the parallel resonant circuit which it comprises, to a frequency which differs sufficiently from the oscillation frequency to provide an additional phase advance of 30°, producing a total phase advance of 120°. Similarly, phase shifter 98 may comprise a parallel-tuned resonant circuit grounded at one end, and so coupled to resonant tank circuit 81 as to provide a phase delay of 90° when tuned to the oscillation frequency. This may be accomplished by employing an opposite polarity of winding of inductor 99 thereof, as compared with inductor 100 of phase shifter 97. The resonant circuit comprising phase shifter 98 is then adjusted so that its resonant frequency differs from the oscillation frequency by an amount sufficient to produce an additional phase delay of 30°, thereby providing a total phase delay of 120°.

The phase-advanced and phase-retarded sampling oscillations from phase shifters 97 and 98, are represented at D and F of FIGURE 2 respectively. The phase-advanced oscillation is supplied to the first control grid 101 of pentagrid sampling tube 60, through the resistance-capacitance network 102, while the phase delayed sampling oscillation is supplied to the first control grid 103 of sampling tube 62 through corresponding resistance-capacitance network 104.

The magnitudes of each of the three sampling oscillations thus derived are sufficiently great to over-drive the grids of each of the three sampler tubes. Furthermore, the time constant of each of the resistance-capacitance networks in series with the first control grids of the sampler tubes, is long compared to the period of sampling oscillations, and, as a result, each sampler tube is rendered conductive only for relatively brief intervals when the sampling oscillations applied thereto are near their positive peaks. Thus, when the phase-advanced sampling oscillation from phase shifter 97 is supplied to first control grid 101 of sampler tube 60 through resistance-capacitance network 102, grid 101 is driven positive with respect to the cathode 67 only during a brief interval near the positive peak of the oscillation, during which time grid current flows from grid 101 to cathode 67. As a result of this grid current, the plate of the condenser 107 in the resistance-capacitance network 102 to which grid 101 is connected, is caused to charge negatively, and, upon the cessation of grid current flow, this condenser is left with a charge which is dissipated through resistor 108. Since the time constant of resistor 108 and capacitor 107, in combination, is relatively high, no great fraction of the total charge on the capacitor is dissipated in the intervals between successive grid current pulses, and, as a result, there is developed at grid 101 a negative bias such that the peak of the sampling oscillation applied to the grid exceeds cathode potential only during brief intervals in which the small amount of charge lost by the condenser between successive grid current pulses is replaced. Due to this leveling action, the positive peaks of the sampling oscillation are held substantially at ground potential in the present instance, and plate current is permitted to flow in tube 60 only during those intervals when the sampling oscillation is above the cut-off voltage of the tube as represented by the level X at D in FIGURE 2. During these intervals of conduction, the peak amplitude of the plate current pulse is determined by the corresponding instantaneous value of the red video input signal, as described above.

The blue and green sampler tubes 61 and 62 respectively, operate in a similar manner in response to sampling oscillations supplied thereto to produce pulses of plate current in common load resistor 71, which pulses are mutually displaced in phase by 120° due to the corresponding phase displacement of the sampling oscillations, as described above.

The total signal appearing across common plate load resistor 71 comprises the composite sampled video signal due to all three sampler tubes, as represented at J of FIGURE 2. This composite pulse signal is supplied to phase inverter tube 110 through the coupling network comprising coupling capacitor 111 and grid leak resistor 112. The function of the phase inverter is merely to reverse the polarity of the pulse signals supplied thereto, and may conveniently comprise a pentode vacuum tube whose suppressor and cathode are grounded, and whose screen is supplied with a suitable positive potential. The plate 113 of pentode 110 is connected to a source of positive potential B+ through plate load resistor 114, whose value may be relatively low so as to avoid distortion of the pulse signals. The signal produced at plate 113 is supplied through coupling capacitor 115 to control grid 7 of cathode-ray tube 4.

Control grid 7 of cathode-ray tube 4 is connected through grid resistor 117 to a source of negative potention B−, the voltage of which is sufficient to produce, in the absence of signals applied to grid 7, a cathode ray beam of relatively low intensity. As explained hereinafter, this minimum illumination is preferably just small enough so that, when the cathode-ray tube face is viewed through glass plate 38 under normal conditions of ambient illumination, the screen appears to be essentially black during black portions of the television picture.

The positive pulses applied sequentially to grid 7 therefore cause the intensity of the cathode-ray beam to increase by amounts substantially proportional to the amplitudes of these pulses. Simultaneously, the cathode-ray beam is caused to scan a television raster upon phosphor-striped screen 9. As the beam is deflected laterally, it impinges red, blue, and green phosphor stripes in that order, and, at the same time, samples of the red, blue, and green video signals are applied to control grid 7 in this same order. A circuit arrangement which may be used to produce and maintain the desired time correspondence between impingement of stripes of each color and the application of the corresponding color samples to control grid 7 will now be described.

As in FIGURE 1, the beam-perceptive device comprises in this instance the three phototubes 28, 29, and 30, with their associated spectral filters 31, 32, and 33, each phototube being connected in series with a source of current and a load resistor. Thus, phototube 28 is connected in series with voltage source 119 and load resistor 120, its photosensitive cathode being connected to the negative terminal of the voltage source, and is responsive to red light passing through red filter 31 to produce a pulse of current through load resistor 120, and hence a pulse of voltage thereacross.

In a similar manner, voltage pulses are produced across load resistors 121 and 122 in response to impingement of the cathode-ray beam upon blue and green phosphor stripes respectively. The low-potential terminal of each of the load resistors may be grounded, the positive voltage pulses produced at the high potential terminals of load resistors 120, 121 and 122 then being coupled to the input terminals of bandpass amplifiers 123, 124 and 125, respectively.

Since it is only the phase of the various indexing pulses applied to the three bandpass amplifiers which is of interest in the present instance, it is not necessary to preserve the waveshape of these pulses. It is, in fact, convenient in the present embodiment to convert the pulse signals into substantially sinusoidal oscillations before phase comparison with the sampling oscillations. Accordingly, each amplifier may be tuned to respond to only a relatively small band of frequencies symmetrically disposed about the average repetition frequency of the pulses produced by each phototube. The bandwidth of the amplifiers need be only sufficient to accommodate the contemplated variations in the rate at which color lines are scanned by the cathode-ray beam in normal operation. Since this bandwidth is generally relatively small, adequate gain may be attained without circuit complexity.

The output signal of each of the bandpass amplifiers is an indexing oscillation whose phase bears a fixed relation to the phase of the corresponding indexing pulse signal applied to the input thereof, as may be appreciated from a comparison of the red, blue, and green indexing pulses represented at L, M, and N, of FIGURE 2 respectively, with the corresponding sinusoidal indexing oscillations represented at K. It is noted that each indexing oscillation is passing from positive to negative values when the corresponding indexing pulses are at their peaks. Phase coincidence between these zero values of the indexing oscillation and the peaks of corresponding indexing pulses may be obtained by suitable adjustment of the phase delay characteristics of the bandpass amplifiers, in a manner well known to those skilled in the art. Thus, this phase relation may be obtained by adjustment of the resonant frequencies of the tuned circuits in the amplifiers, or by including in the amplifiers suitably adjusted resistance-capacitance phase shifting networks. In the present embodiment, the phase-adjusting means may comprise resistance-capacitance phase shifting networks 127, 128, and 129, connected to the output terminals of amplifiers 123, 124, and 125 respectively, and adjustable by variation of the values of the resistors thereof to produce the above-specified phasing of the indexing oscillations in a manner well known in the art.

The indexing oscillations from the three bandpass amplifiers are supplied to the three phase comparators, which operate to maintain a fixed phase relation between sampling oscillations and indexing oscillations such that the peaks of the sampling oscillations, and hence the color pulse samples, occur at times when the indexing oscillations are passing from positive to negative values and hence at times when the corresponding indexing pulses are substantially at their peak values.

These phase comparators may comprise pentagrid tubes 130, 131, and 132, each of which may have their suppressors and cathodes grounded, and their screen electrodes connected to suitable sources of screen potential. The plates 133, 134, and 135 of tubes 130, 131, and 132 respectively, are connected together, and to a source of positive potential designated B+ through the parallel combination of resistor 136 and capacitor 137. The red indexing oscillation from bandpass amplifier 123 is supplied to the second control grid 138 of phase comparator tube 130, and the blue and green indexing oscillations from amplifiers 124 and 125 being supplied to the second control grids of phase comparator tubes 131 and 132, respectively.

The first control grid of each of the phase comparator tubes is supplied with the sampling oscillation used to actuate the corresponding sampling tube, through a resistance-capacitance network of relatively long time constant. Thus the sampling oscillation applied to the first control grid 101 of the red sampler tube 60, is supplied through coupling capacitor 140 to first control grid 141 of phase comparator tube 130, from which latter grid to ground there is connected a resistor 142. Similarly, the sampling oscillations supplied to the first control grids of the blue and green sampler tubes 61 and 62 are connected through similar resistance-capacitance networks to the first control grids of the phase comparator tubes 131 and 132 respectively.

The details of the operation of phase comparator circuits of this general type are well known, and need be described only briefly here. It may be noted, however, that, due to the relatively long time-constant of the resistance-capacitance networks through which sampling oscillations are applied to the phase comparator tubes, these tubes are caused to conduct only when the sampling oscillations are near their positive peak values, in a manner directly analogous to the operation effected by the first control grids of the sampler tubes, as described above. Accordingly, the effect of the sampling oscillations is to produce pulses of plate current in the phase comparator tubes only at times when the corresponding sampling oscillations are near their peak values and hence at those times when corresponding sampler tubes are also being actuated in response to the same signals. For example, red sampler tube 60 and red phase comparator tube 130 are rendered conductive simultaneously.

Considering the operation of the phase comparators, it may first be assumed that no indexing oscillations are applied to the tubes, but that the sampling oscillations are applied to the first control grids thereof, to produce pulses of current sequentially in said tubes and through the common plate load circuit. The time constant of resistor 136 and capacitor 137 connected in the plate circuit of the three phase comparator tubes, may be chosen sufficiently large to prevent the plate voltage of the tubes from changing appreciably during several successive cycles of sampling oscillations, e.g. 6 cycles. The plate voltage of these tubes is therefore substantially constant during the time required to scan approximately 6 picture elements. This permits averaging together of the signals from the three phase comparators, as well as some integration of the effects of pulses produced by adjacent color triplets. However, this time constant is sufficiently short to permit the plate voltage to follow variations occurring at any appreciably slower rate.

The plates of the three phase comparators are connected to second control grid 80 of sampling oscillator 23 through a voltage divider circuit whose output voltage is less than the potential at the plates of the phase comparator tubes by a substantially constant amount. This permits operation of grid 80 in its normal voltage range, which is near ground potential. Thus, resistors 150 and 151 are connected in series between the phase comparator plates and a terminal to which a suitable negative voltage is supplied, the junction of the two resistors being connected to grid 80. The resistance of the latter two resistors in series is preferably large compared with the value of plate resistor 136, and the resistance of resistor 150 preferably large compared to that of resistor 150. Variations in the voltage at the phase comparator plates are then delivered to grid 80 of the sampling oscillator at a suitable D.-C. level.

The tank circuit 81 of sampling oscillator 23 may be adjusted in the absence of indexing oscillations, to produce oscillations at a natural frequency substantially equal to the average rate at which triplets of color lines are traversed by the cathode-ray beam. The control voltage then produced at grid 80 in response to sampling oscillations alone, has a value which will be referred to as the zero value of control voltage. If now the indexing oscillations are applied to the second control grids of the phase comparator tubes, the plate currents of the tubes, and hence the common plate voltage supplied as a control voltage to the sampling oscillator, will depend upon the phases of the indexing oscillations with respect to the pulses of current produced by the sampling oscillations.

Figure 8:
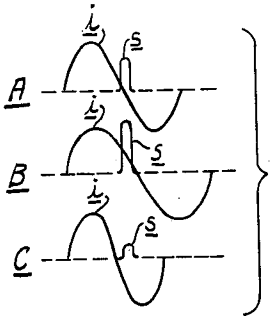
FIGURE 8 is a graphical representation illustrating the operation of the phase comparators shown in FIGURE 7.

This latter relationship is illustrated by the diagram of FIGURE 8, wherein the sinusoid $i$ represents the red indexing oscillation applied to grid 138 of tube 130, and the pulse $s$ represents the pulse of plate current produced in the same tube by the red sampling oscillation. At A of the figure, there is illustrated the case in which the indexing oscillations occur at the natural frequency of the sampling oscillator. Under these conditions, the plate current pulse due to the sampling oscillation is seen to occur at a time when the indexing oscillation is zero. As a result, the indexing oscillation produces no modification of the control voltage applied to the sampling oscillator 23. However, should the scanning velocity of the cathode-ray beam diminish, so as to reduce the frequency of the indexing oscillations, the plate current pulses due to the sampling oscillations will tend to occur earlier with respect to the indexing sine-wave, and thus at a time when the latter sine-wave is somewhat positive, as represented at B. As a result, the plate current pulse $s$, as shown at B of FIGURE 8, is larger than in the previous case illustrated at A of the figure, the total current through the resistance-capacitance network in the plate circuit of the phase comparator is increased, and the control voltage applied to grid 80 of the sampling oscillator is correspondingly reduced. As a result, the frequency of the sampling oscillator diminishes, which reduction tends to continue momentarily, in response to succeeding indexing oscillations, until the previously-existing phase condition is substantially fully regained, in which condition the current pulses due to the sampling oscillations again occur at times when the indexing oscillations are at nearly zero value. On the other hand, should the frequency of the indexing oscillations increase, as will occur when the scanning velocity of the beam increases, the plate current pulses due to the sampling oscillation will tend to occur later with respect to the indexing sine-wave $i$ from the bandpass amplifiers, and hence at a time when the since-wave has a negative value, as represented at C. As a result, the average current through the resistance-capacitance network tends to decrease, whereby the control voltage is increased and the frequncy of the sampling oscillator is also caused to increase, until the plate current pulses due to sampling oscillations again occur at times when the indexing oscillations are substantially zero. A similar operation takes place with respect to the blue and green phase comparator tubes, the output voltage of which augment the control voltage used to correct the frequency of oscillator 23.

The net effect of the operation of the phase comparators in controlling the frequency of the sampling oscillator, is to cause actuation of each of the color samplers at substantially those times when the corresponding indexing oscillations change from positive to negative values, and hence at times when the corresponding indexing pulses are at their peaks. By automatically maintaining this relationship, samples of the video input signals of each color are applied to control grid 7 of cathode-ray tube 4 when phosphor stripes of the corresponding color are impinged, and proper color phasing is ensured.

It is noted that, in some instances, additional phase delays may exist in the above described circuit due to the inherent characteristics of some of the circuits employed, or that, in some applications it may be desirable to insert into the circuit, for special reasons, other elements which may affect appreciably the phases of the signals involved. However, so long as these elements introduce only fixed phase differences, and so long as the phase comparator arrangement is such as to maintain some fixed phase relation between indexing pulses and signals from the sampling oscillator, any phase discrepancies thus introduced may be compensated by suitable adjustment of the phase shifting circuits 127, 128, 129 of FIGURE 7, or by the addition of other phase-compensating networks in a manner which will occur readily to one skilled in the art.

It is desired to emphasize that, while the system of FIGURE 5, which is characterized by the derivation of a single indexing pulse per color triplet, has the advantage of greater structural simplicity, that of FIGURES 1 and 7, which is characterized by the production of three indexing pulses per color triplet, has the advantage of greater accuracy. The greater accuracy of this system is due not only to the fact (previously noted) that it tends to compensate even for variations in beam scanning rate which occur within the confines of a single color triplet, but also to the fact that variations in the relative intensities with which the beam impinges upon the different color stripes of any given triplet have hardly any effect upon the phase and/or frequency of the signals from the sampling oscillator. Since these variations in relative beam intensities denote intentional variations in hue of the image which is being reproduced, the system of FIGURES 1 and 7 will reproduce changing colors with superior fidelity.

More particularly it will be recalled that, in the system of FIGURES 1 and 7, the three separate indexing pulse trains derived in response to beam impingement upon the different colored light emissive lines of the screen structure are phase detected by heterodyning each pulse train with a signal from an oscillator whose phase represents the time-phase positions of those intervals during which the beam intensity control signal represents information concerning the color which generates the indexing pulse train. Obviously these are also the time-phase positions of those intervals during which it is desired to have the beam impinge upon screen lines emissive of light of the aforementioned color. Thus any departure from cophasal relationship between a given indexing pulse train and the oscillator signal used for the detection of its phase will denote a departure from coincidence between the time-phase positions of intervals during which the signal is representative of a particular color, and intervals during which the beam impinges on corresponding color lines.

It may be shown that, when several trains of indexing pulses are derived in different time-phase positions (e.g. three indexing pulse trains with mutual 120° phase displacement) and when phase variations in these pulse trains are detected by heterodyning each one with a signal which has that phase which the pulse train would have if it were not subject to the aforementioned variations, then the phase variations due to variations in the rate of beam deflection and/or in the distribution of the color lines will be of the same sense for all of these indexing pulse trains and will therefore produce phase detector outputs of the same polarity. When added, these outputs will then exert a much stronger control effect on the phase of the heterodyning oscillator than would be exerted by the output from a single phase detector operating upon a single indexing pulse train. By contrast, phase variations in the indexing pulse trains which result from intentional variations in the hue of the reproduced image (i.e. from variations in the relative intensities with which the beam impinges upon color lines emissive of light of different colors), will produce phase departures of opposite senses in different ones of the indexing pulse trains so that the resulting variations in phase detector output signals will tend to nullify each other and to leave the oscillator phase unaffected.

As a result the effectiveness of hue changes in causing undesired variations in the phasing of the sampling oscillator will be substantially reduced and color fidelity will be correspondingly enhanced.

Although the invention has been described with reference to specific embodiments thereof, it will be apparent to those skilled in the art that it is susceptible of divers other embodiments without departing from the spirit thereof. Thus the exact structure utilized to derive indexing signals indicative of the position of the cathode-ray beam may take any of a variety of forms, as may the circuits employed to control the sampling of the several input signals in accordance with the intelligence contained in the indexing signals so derived. For example, beam-perceptive indexing members may be employed which are spaced behind the tube screen by a considerable distance, but in predetermined geometric relation to the various color regions of the screen. Nor is it essential in all cases that these members be impinged by the beam, as they may be adapted in certain instances to sense the mere adjacent passage of the beam. Further, it will be apparent that it is not essential to the invention that the input signals to be sampled be continuously present, as has been represented in the preceding detailed description, so long as each signal is present at those times when sampling thereof is to be effected. It should also be understood that, although the invention as described herein in detail has been proposed for use in controlling the actuation of a signal sampler as a function of the position of a cathode-ray beam upon a striped screen, the invention finds application in effecting actuation or control of any device as a function of the position of a cathode-ray beam.

I claim:

1. In combination: a cathode ray tube having a screen comprising a plurality of interleaved sets of indexing portions and means for projecting a beam toward said screen; means for deflecting said beam to cause it to traverse indexing portions belonging to different ones of said sets in recurrent sequence; means responsive to electron beam traversal of the indexing portions belonging to different ones of said sets to produce different indexing signals, each having a phase which varies in accordance with irregularities in the rate at which said beam traverses the indexing portions productive of said signal; and means for producing a signal representative of the algebraic sum of the phase variations in all of said indexing signals.

2. In combination: a cathode ray tube having a screen comprising a plurality of interleaved sets of indexing portions and means for projecting an electron beam toward said screen; means for deflecting said beam to cause it to traverse in recurrent sequence indexing portions belonging to different ones of said sets; means responsive to electron beam impingement upon the indexing portions belonging to different ones of said sets to produce different indexing signals, each having a phase which varies in accordance with irregularities in the rate at which the beam traverses the indexing portions productive of said signal; means for producing a control signal representative of the algebraic sum of the phase variations of all of said indexing signals; means for producing a reference signal at a frequency equal to the regular rate of traversal by said beam of the indexing portions belonging to one of said sets; and means for utilizing said control signal to control the phase of said reference signal.

3. In combination: a cathode ray tube having a screen comprising a plurality of interleaved sets of indexing portions and means for projecting a beam of electrons toward said screen; means for deflecting said beam to cause it to traverse indexing portions belonging to different ones of said sets in recurrent sequence; means responsive to electron beam traversal of the indexing portions belonging to different ones of said sets to produce different indexing signals, each having a phase which varies in accordance with irregularities in the rate at which said beam traverses the indexing portions productive of said signal; means for producing a plurality of reference signals, each having a frequency equal to the regular rate of traversal by said beam of the indexing portions belonging to one of said sets; means for producing a plurality of error signals, each representative of relative phase variations between one of said reference signals and one of said indexing signals and different ones of said error signals being representative of different ones of said relative phase variations; means for additively combining said error signals into a single control signal; and means for utilizing said control signal to control substantially equally the phases of all of said reference signals.

4. The combination of claim 3 characterized in that said means for producing a plurality of reference signals comprises an oscillator and means for deriving a plurality of output signals from said oscillator, and in that said means for utilizing said control signal comprises means for controlling the frequency of said oscillator.

5. A color television image presentation system comprising: a first, a second, and a third source of signals indicative respectively of different color components of light from a televised scene; a cathode-ray tube having a beam-interceptive screen member upon which a color image of said televised scene is to be produced, said screen comprising stripe regions of a first class which are responsive to electron impingement to produce light of one of said colors, stripe regions of a second class which are responsive to electron impingement to produce light of another of said colors, and stripe regions of a third class which are responsive to electron impingement to produce light of the third of said colors; first, second, and third spectrally-selective photosensitive devices respectively responsive to light of said different colors from said screen member to produce three separate indexing pulse signals, pulses of each of said indexing signals corresponding in time to the impingement of said beam upon stripe regions of a predetermined one of said classes; said cathode-ray tube also having a beam intensity-controlling element responsive to signals applied thereto to control the intensity of said beam and deflecting means for causing said beam to scan a television raster upon said screen member; three sequentially actuatable signal sampling devices each connected to a different one of said signal sources and each operative upon actuation to supply signals from one of said sources to said intensity-controlling element of said cathode-ray tube; means including a sampling oscillator of controllable frequency for supplying three separate and mutually phase-displaced sampling signals to said sampling devices to produce sequential actuation thereof; signal-phase comparing means supplied with said indexing pulse signals and with said sampling oscillations for producing a control signal indicative of the magnitudes and senses of departures of the phase relations between said pulse signals and said sampling oscillations from a predetermined value; and means for supplying said control signal to said sampling oscillator to vary the frequency thereof in such sense as to reduce the phase departures producing said control signal.

6. A system in accordance with claim 5, in which said phase comparing means includes a reactive circuit across which said control voltage is developed, said reactive circuit having a time constant substantially equal to the time required for said beam to scan across several adjacent stripe regions of said screen member.

7. In a color television image presentation system, a cathode-ray tube having an intensity-controlling element responsive to applied signals for controlling the intensity of the cathode-ray beam, a screen member upon which said beam is adapted to impinge, said screen member comprising a plurality of laterally-displaced regions which differ in respect of the color of light emitted thereby in response to electron impingement, a signal sampling device comprising a plurality of input terminals and a common output terminal, said input terminals being adapted to be supplied with separate input signals and said common output terminal being connected to said intensity-controlling element of said cathode-ray tube, said signal sampling means being controllably actuatable in response to control signals supplied thereto to connect said input terminals to said common output terminal in time sequence, beam-perceptive means associated with said screen member and responsive to impingement of predetermined regions of said screen member by said cathode-ray beam to produce indexing signals indicative of the position of said beam, a source of sampling oscillations, phase-shifting means responsive to said sampling oscillations for supplying said sampling oscillations in predetermined different phases to said input terminals of said sampling device, and means responsive to said indexing signals for controlling the frequency of said sampling oscillations.

8. The system of claim 7, in which said means for controlling the frequency of said sampling oscillations comprises phase-comparing means responsive to said phase-shifted sampling oscillations and to said indexing signals to produce an error signal indicative of the departure from a predetermined value of the phase relation between said phase-shifted sampling signals and said indexing signals, and means responsive to said error signal for varying the frequency of said sampling oscillations in such a direction as to reduce said departure from said predetermined phase relation.

9. A color television image presentation system comprising: a cathode-ray tube having a beam-interceptive screen member upon which a color image of a televised scene is to be produced, said screen comprising stripe regions of a first class which are responsive to electron impingement to produce light of one color, stripe regions of a second class which are responsive to electron impingement to produce light of a second color, and stripe regions of a third class which are responsive to electron impingement to produce light of a third color; first, second and third spectrally-selective photosensitive devices respectively responsive to light of said different colors from said screen member to produce three separate indexing signals, each of said indexing signals corresponding in time-phase to the impingement of said beam upon stripe regions of a predetermined one of said classes; deflecting means for causing said beam to scan a television raster upon said screen member; means including an oscillator of controllable frequency for producing three separate and mutually phase-displaced signals; signal-phase comparing means supplied with said indexing signals and with said mutually phase-displaced signals for producing a control signal indicative of the magnitudes and senses of departures of the phase relations between said indexing signals and said mutually phase-displaced signals from a predetermined value; and means for supplying said control signal to said oscillator to vary the frequency thereof in such sense as to reduce the phase departures producing said control signal.

10. A color television image presentation system comprising: a cathode ray tube having a beam-interceptive screen member upon which a color image of a televised scene is to be produced, said screen comprising stripe regions of a first class which are responsive to electron impingement to produce light of one color, stripe regions of a second class which are responsive to electron impingement to produce light of a second color, and stripe regions of a third class which are responsive to electron impingement to produce light of a third color; first, second and third spectrally-selective photosensitive devices respectively responsive to light of said different colors from said screen member to produce three separate indexing signals, each of said indexing signals corresponding in time-phase to the impingement of said beam upon stripe regions of a predetermined one of said classes; deflecting means for causing said beam to scan a television raster upon said screen member; means including an oscillator of controllable frequency for producing three separate and mutually phase-displaced signals; three separate signal-phase comparing means, each supplied with a different one of said indexing signals and with a different one of said mutually phase-displaced signals for producing a plurality of output signals respectively indicative of the magnitudes and senses of departures of the phase relations between said indexing signals and said mutually phase-displaced signals from predetermined values; means for additively combining said output signals; and means for supplying the signal produced by said combining means to said oscillator to vary the frequency thereof in such sense as to reduce the phase departures producing said output signals.

11. A color television image presentation system comprising: a cathode ray tube having a beam-interceptive screen member upon which a color image of a televised scene is to be produced, said screen comprising stripe regions of a first class which are responsive to electron impingement to produce light of one color, stripe regions of a second class which are responsive to electron impingement to produce light of a second color, and stripe regions of a third class which are responsive to electron impingement to produce light of a third color; first, second and third spectrally-selective photosensitive devices respectively responsive to light of said different colors from said screen member to produce three separate indexing signals, each of said indexing signals corresponding in time-phase to the impingement of said beam upon stripe regions of a predetermined one of said classes; deflecting means for causing said beam to scan a television raster upon said screen member; means including an oscillator for producing three separate and mutually phase-displaced signals; three separate signal-phase comparing means each supplied with a different one of said indexing signals and with a different one of said mutually phase-displaced signals for producing a plurality of output signals respectively indicative of the magnitudes and senses of departures of the phase relations between said indexing signals and said mutually phase-displaced signals from predetermined values; and means for additively combining said output signals to produce a single signal representative of the aggregate of said departures.

12. A television system comprising: a cathode ray tube; sensing means to sense the position of the electron beam therein; amplifier means to control the intensity of said electron beam; coupling means connected between said sensing means and said amplifier means to control the operation of said amplifier means, said coupling means comprising: a center tapped transformer which generates a waveform having a basic frequency dependent on the instantaneous scanning speed of said electron beam.

References Cited in the file of this patent

UNITED STATES PATENTS

| | | |
|---|---|---|
| 2,545,325 | Weimer | Mar. 13, 1951 |
| 2,633,547 | Law | Mar. 31, 1953 |